Oct. 17, 1950
H. G. HAAS
2,526,133
ANTIHUNTING SYSTEM FOR ELECTRICAL REGULATORS
Filed Aug. 23, 1949
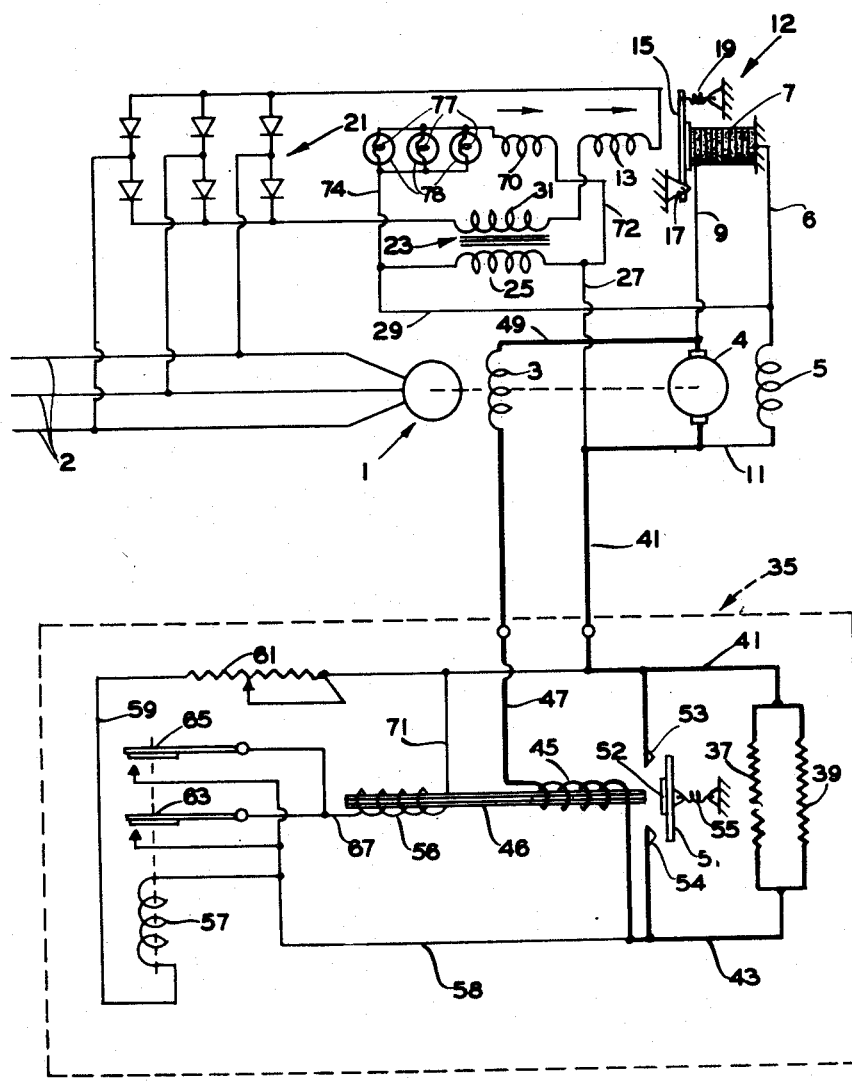
INVENTOR.
HAROLD G. HAAS
BY
ATTORNEY Patented Oct. 17, 1950

2,526,133

UNITED STATES PATENT OFFICE 2,526,133

ANTIHUNTING SYSTEM FOR ELECTRICAL REGULATORS

Harold G. Haas, Belleville, N. J., assignor to Bendix Aviation Corporation, Teterboro, N. J., a corporation of Delaware Application August 23, 1949, Serial No. 111,888

4 Claims. (Cl. 322—19)

The subject application relates to an antihunting circuit for an electrical regulator and more particularly to improvements in a control circuit of the type disclosed in the copending applications Serial No. 21,886, filed April 19, 1948 by Harold G. Haas, now U. S. Patent No. 2,499,272 and Serial No. 57,254, filed October 29, 1948 by Lawrence E. Gartner and Joseph W. Allen, both of which applications have been assigned to the same assignee as the present application.

In the present application, there is provided a regulator system such as shown in the application Serial No. 57,254 with the addition of an auxiliary regulator coil which aids and lags the main regulator coil ampere turns so as to provide a follow-up action increasing the stability of the system. The lagging ampere turns of the auxiliary coil is caused by variance with current flow in the resistance of suitable lamp filaments connected in series with the auxiliary coil and across the field of the exciter so as to tend to wipe out the follow-up action of the auxiliary coil in a retarded manner.

In distinction over the system disclosed and claimed in the Haas U. S. Patent No. 2,499,272, the anti-hunting action of the follow-up coil of the present disclosure is furthered by the action of an anti-hunting transformer also connected across the field of the exciter and cooperating with the auxiliary coil in effecting the anti-hunting action in which the transformer responds more quickly to change than the auxiliary coil so that the follow-up effect of the anti-hunting transformer is wiped out more rapidly while the time constant of the auxiliary coil is greater than that of the anti-hunting transformer and the follow-up effect of the auxiliary coil is wiped out more slowly due to the time lag for the heating or cooling of the lamp filaments upon change in excitation of the exciter field.

An object of the present invention therefore is to provide an improved anti-hunting system in which an auxiliary regulator coil and a changing-resistance-with-current conducting device connected across an exciter field introduces a relatively slowly acting anti-hunting component which cooperates with a main regulator coil having connected in the energizing circuit thereof an anti-hunting transformer connected across the exciter field to effect an anti-hunting bias in the main control winding which is more rapidly responsive to change in the exciter field energizing current than the auxiliary coil.

The above and other objects and features of the invention will appear more fully hereinafter from a consideration of the following description taken in connection with the accompanying drawing where one embodiment of the invention is illustrated by way of example. In the drawing, there is illustrated diagrammatically an embodiment of our invention.

Referring now to the drawing, there is shown an alternating current generator or alternator 1 which is connected to supply power to an external load circuit through conductors 2. Alternator 1 is provided with a field winding 3 which is energized by exciter 4 having a shunt field winding 5. Connected in series with the field winding 5 of the exciter 4 by a conductor 6 is a variable resistance carbon pile element 7. The resistance element 7 is connected at its opposite end by a conductor 9 to an output terminal of the exciter 4. The opposite output terminal of the exciter 4 is connected by a conductor 11 to the exciter field winding 5.

Thus, the excitation of the exciter field winding 5 is controlled by the variable resistance carbon pile element 7. The variable resistance carbon pile element 7 may be embodied in a regulator 12 of a type such as shown in U. S. Patent No. 2,427,805, granted September 23, 1947 to W. G. Neild and assigned to Bendix Aviation Corporation.

The regulator 12 may include a main control winding 13 arranged to control an armature 15 shown diagrammatically herein as pivoted at 17 and exerting a compressive force upon the carbon pile 7 under tension of a spring 19. The spring 19 is arranged so as to balance the pull on the armature by the electromagnetic winding 13 when energized by a line voltage having a predetermined value, as described in greater detail in the aforenoted patent.

Interposed between alternator output 2 and the main control coil 13 is a full wave rectifier 21 which may be of any suitable type such as the well known copper oxide variety.

There is further provided a transformer comprising a core 23 having a primary winding 25 connected so as to have its energization varied in accordance with the operation of the regulator 7 and, as shown, it is connected across the terminals of the field winding 5 of the exciter 4 through conductors 27 and 29.

Also wound on the core 23 is a secondary winding 31 inductively coupled to the primary winding 25 and connected so as to apply a transient corrective or anti-hunting bias to the control coil 13. The primary winding 25 induces such bias into the secondary winding 31 during change in the voltage across the field winding 5. As shown, the secondary winding 31 is connected in series with the main control coil 13 on the output or direct current side of the rectifier 21, as disclosed and claimed in U. S. Patent No. 2,211,612, granted August 13, 1940 to L. W. Thompson and assigned to General Electric Company.

There is further provided an exciter control indicated generally by the numeral 35 and disclosed and claimed in the copending application Serial No. 57,254, filed October 29, 1948 by Lawrence E. Gartner and Joseph W. Allen and assigned to the assignee of the present application.

The exciter control 35 includes resistor elements 37 and 39 connected at one end by a conductor 41 to an output terminal of the exciter 4, while the opposite end of the resistance elements 37 and 39 are connected by a conductor 43 to one end of a main control electromagnetic winding 45 wound on a magnetic core 46. The opposite end of the winding 45 is connected by a conductor 47 to the alternator field winding 3 which is in turn connected at the opposite end through conductor 49 to the other output terminal of the exciter 4.

It will be seen then that when the resistor elements 37 and 39 are inserted between output conductor 41 of the exciter 4 and the field winding 3 of the alternator 1, energization of the alternator field 3 is materially reduced.

A main control switch 51 having an armature 52 cooperating with the core 46 is arranged to shunt the resistance elements 37 and 39 out of operation upon closing contacts 53 and 54 connected to conductors 41 and 43 respectively. The latter main control switch 51 is normally biased to an open position by a spring 55 and is biased to a closed position by the combined electromagnetic forces of the main control winding 45 and an auxiliary winding 56 acting on armature 52.

The ampere turns of the windings 45 and 56 act in additive relation. Energization of the auxiliary winding 56 is controlled by a pilot relay winding 57 connected by conductors 58 and 59 across the resistor elements 37 and 39.

Connected in the conductor 59 is a swamping resistor 61 which may be so adjusted that the closing of the main switch 51 controlled by the pilot relay winding 57 is set to the desired closing current and hence voltage value. The pilot relay 57 operates relay switch elements 63 and 65 to control energization of the auxiliary winding 56 by shunting auxiliary winding 56, at the predetermined voltage, across resistors 37 and 39 through conductors 43 and 58, switch arms 63 and 65, conductor 67, auxiliary winding 56 and conductors 71, 59 and 41.

Thus, upon the closing of switch elements 63 and 65, the auxiliary winding 56 is energized by the drop across the main resistors 37 and 39 so as to cause with the main control winding 45 the closing of the main contactor 51. On the closing of the main control switch 51, the main resistors 37 and 39 are shorted out, reducing the voltage drop across the resistors 37 and 39 to substantially zero.

With the zero voltage, the pilot relay 57 permits switch arms 63 and 65 to be biased under inherent spring tension in a direction to open the circuit of the auxiliary winding 56 of the main contactor. The main contactor 51, however, remains closed by virtue of the ampere turns of the series winding 45 which is sufficient to maintain the main contactor 51 closed due to the shunting of resistors 37 and 39 and the decrease in the air gap between the core 46 and armature 52. However, as the current in the alternator field 3 drops, the main contactor 51 controlled by the winding 45 will open at a current value governed by the ampere turns of the series winding 45 and adjustment of the biasing spring 55.

Upon the opening of contactor 51 resistors 37 and 39 are again inserted in the field winding 3 of the alternator 1.

As such, the differential between closing and drop out of the main contactor 51 is a controllable function of the current in the field winding 3 of the alternator. When installed in a complete system, operation is as follows: at the minimum speed of the alternator 1 the main contactor 51 remains closed for all load conditions. At higher operating speeds and under lightly loaded conditions, the main contactor 51 opens and inserts the main resistance in the alternating field 3. For fully loaded conditions the contactor 51 necessarily remains closed at all speeds.

Thus, upon the current to the field winding 3 exceeding a predetermined minimum value set by the adjustment of the swamping resistor 61, the resistors 37 and 39 are shunted out of the circuit of the field winding 3 by the closing of main switch 51 and regulation of the alternator output is effected through carbon pile regulator 12. However, when the current to the field winding 3 falls below a predetermined minimum the series winding 45 permits switch 51 to open under tension of the spring 55 inserting the resistors 37 and 39 into the circuit of the field winding 3 so that regulation of the output of the alternator may continue to be effected by the regulator 12 without tending to buzz or tirrill.

Anti-hunting circuit

The novel feature of the present application is the provision of an auxiliary winding or coil 70 connected at one end by a conductor 72 to conductor 27 and at the opposite end by a conductor 74 to the conductor 29. Thus the auxiliary winding or coil 70 is connected across the exciter field winding 5 through conductors 27, 72, 74 and 29 and is effected by the voltage applied to the exciter winding 5. The auxiliary coil 70 acts on the armature 15 of the regulator 12 in additive relation to the main coil 13 so that upon change in the voltage applied to the exciter field 5 due to adjustment of the carbon pile 7, the auxiliary coil 70 acts so as to temporarily inhibit further change.

Connected in the conductor 74 are filaments 77 of lamps 78 which form a part of the energizing circuit for the anti-hunting or follow-up winding 70. The filaments 77 are such that as the temperature of the filaments 77 rises with increase in current flow the resistance of the filaments 77 to current flow likewise increases with a lag in time so as to counteract the inhibiting effect and decreases the energization of the winding 70 to cause a corresponding resetting of the winding 70.

Upon a change in an opposite sense, a decrease in the current flow through the filaments 77 will cause a decrease in the temperature and in the resistance of the filaments 77 upon a similar time lag and a resetting of the winding 70 with a corresponding increase in the energization of the winding 70.

Thus the heating lag of the filaments 77 introduces a rate component into the energizing circuit for the anti-hunting winding 70.

This rate component is such that the effect of the winding 70 on the regulator 12 is wiped out more slowly than the anti-hunting bias introduced into the main control winding 13 of the regulator 12 by the anti-hunting transformer 23 upon change in the voltage across the exciter field winding 5. The anti-hunting component thus introduced by the anti-hunting winding 70 and lamp filaments 77 cooperate with the anti-hunting bias introduced in the main control winding 13 by the anti-hunting transformer 23 upon change in the voltage across the exciter field 5. Due to the time constant of the lamp filaments 77 the follow-up bias applied by the winding 70 is eliminated more slowly than the transitory follow-up bias applied by transformer 23 to the main control winding 13. This slower action may be attributed to the time lag for the heating or cooling of the lamp filaments 77 upon change in excitation of the exciter field winding 5.

Further the time constant of the auxiliary winding 70 is greater than that of the anti-hunting transformer 23 so that the transformer 23 responds more quickly to change than the auxiliary winding 70, while the follow-up effect of the auxiliary winding 70 is wiped out more slowly so as to effect greater stability of control in the system described.

Although only one embodiment of the invention has been illustrated and described, various changes in the form and relative arrangements of the parts may be made to suit requirements.

What is claimed is:

1. A regulating system comprising, in combination, a source of electrical energy, means for controlling a function of the output of said source, means for regulating a condition of said control means in response to the output of said source, said regulating means including a first means responsive to change of condition of said control means and effective only during such change of condition of said control means to temporarily inhibit further change by said regulating means, second means responsive to change of condition of said control means to temporarily inhibit further change by said regulating means, and a reset means connected in series relation with said second inhibiting means for counteracting said last mentioned inhibiting effect in a retarded manner.

2. A regulating system comprising, in combination, a generator supplying line current to a variable load and including an exciter field winding, means for controlling the excitation of said exciter field winding, a main control winding to regulate said control means in response to the output of said generator, a transformer including a primary winding connected across the exciter field winding and a secondary winding inductively coupled to the primary winding and connected in series with said main control winding so as to apply thereto a bias induced in the secondary winding by the primary winding during change in the excitation of said field winding and tending to temporarily inhibit further change by said control means, an auxiliary winding cooperating with said main winding and connected across the exciter field winding and cooperating with said transformer upon such change in the excitation of said field winding to temporarily inhibit further change by said control means, and a changing resistance with current conducting device connected in series with said auxiliary winding across the exciter field, said device arranged to increase the resistance of said series connection with current flow in a retarded manner so as to substantially eliminate the last mentioned inhibiting effect of said auxiliary winding.

3. A regulator for a generator supplying line current to a variable load and including an exciter field, comprising a variable resistor, an armature operatively connected thereto, a spring biasing a portion of the armature to tend to operate said resistor in the direction to produce an increase in the exciter field current, a first winding tending to operate the armature in the opposite direction upon an increase of the regulated quantity, a transformer including a primary winding responsive to change in the exciter field current and a secondary winding inductively coupled to the primary winding and connected in series with the first winding so as to apply to the first winding a transitory bias during change in the exciter field current tending to temporarily inhibit further change in the resistance of said resistor, a second winding having a greater time constant than said transformer and more slowly responsive to change of said quantity to bias the armature as an additional follow-up limiting the change of resistance of said resistor, a reset means connected in series with said second winding across the exciter field, said reset means including a second variable resistor element arranged so as to increase the resistance of said series connection in response to increase in temperature of said element with current flow in a retarded manner so as to substantially eliminate the stated follow-up bias of the second winding, and the time lag for change in the temperature of said element being such that the follow-up bias of said second winding is eliminated more slowly than the transitory follow-up bias applied to said first winding through said transformer.

4. The combination defined by claim 1 in which said reset means includes a lamp filament having a variable resistance which increases with temperature for counteracting said inhibiting effect in a retarded manner.

HAROLD G. HAAS.

No references cited.